United States Patent
Sengupta et al.

(10) Patent No.: US 10,320,749 B2
(45) Date of Patent: Jun. 11, 2019

(54) FIREWALL RULE CREATION IN A VIRTUALIZED COMPUTING ENVIRONMENT

(71) Applicant: Nicira, Inc., Palo Alto, CA (US)

(72) Inventors: Anirban Sengupta, Palo Alto, CA (US); Sunitha Krishna, Palo Alto, CA (US); Subrahmanyam Manuguri, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 253 days.

(21) Appl. No.: 15/344,591

(22) Filed: Nov. 7, 2016

(65) Prior Publication Data

US 2018/0131675 A1    May 10, 2018

(51) Int. Cl.
*H04L 29/06* (2006.01)

(52) U.S. Cl.
CPC ...... *H04L 63/0263* (2013.01); *H04L 63/0218* (2013.01); *H04L 63/0245* (2013.01)

(58) Field of Classification Search
None
See application file for complete search history.

(56) References Cited

U.S. PATENT DOCUMENTS

| | | | | |
|---|---|---|---|---|
| 7,096,495 B1 * | 8/2006 | Warrier | ............... | H04L 63/0263 709/224 |
| 7,873,717 B1 * | 1/2011 | Woolway | ............... | G06F 21/552 709/223 |
| 9,088,544 B1 * | 7/2015 | Pan | ............... | H04L 63/0263 |
| 2003/0005144 A1 * | 1/2003 | Engel | ............... | H04L 47/10 709/235 |
| 2005/0021683 A1 * | 1/2005 | Newton | ............... | H04L 41/22 709/220 |
| 2007/0192863 A1 * | 8/2007 | Kapoor | ............... | G06F 9/505 726/23 |
| 2010/0325588 A1 * | 12/2010 | Reddy | ............... | H04L 63/0263 715/853 |
| 2012/0166666 A1 * | 6/2012 | Tollet | ............... | H04L 63/0245 709/230 |
| 2012/0271940 A1 * | 10/2012 | Di Pietro | ............... | G06N 7/005 709/224 |
| 2013/0097692 A1 * | 4/2013 | Cooper | ............... | G06F 21/00 726/14 |
| 2014/0233385 A1 * | 8/2014 | Beliveau | ............... | H04L 47/122 370/235 |

(Continued)

*Primary Examiner* — Malcolm Cribbs
(74) *Attorney, Agent, or Firm* — Su IP Consulting

(57) ABSTRACT

Example methods are provided for a network management entity to perform firewall rule creation in a virtualized computing environment. The method may comprise obtaining flow data associated with an application-layer protocol session between a first endpoint and a second endpoint in the virtualized computing environment; and identifying, from the flow data, an association between a control flow and at least one data flow of the application-layer protocol session. The method may also comprise: based on the association, creating a firewall rule that is applicable to both the control flow and at least one data flow; and instructing a first firewall engine associated with the first endpoint, or a second firewall engine associated with the second endpoint, or both, to apply the firewall rule during the application-layer protocol session.

21 Claims, 6 Drawing Sheets

(56) References Cited

U.S. PATENT DOCUMENTS

2014/0245423 A1* 8/2014 Lee .................... H04L 63/0218
726/12
2017/0006082 A1* 1/2017 Shishodia ............. H04L 67/025
2017/0295031 A1* 10/2017 Bush ....................... H04L 43/08

* cited by examiner

FIREWALL RULE CREATION IN A VIRTUALIZED COMPUTING ENVIRONMENT

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

In order to meet new requirements of granularity and scalability in the virtualized computing environment, a firewall engine may be deployed on each hypervisor to protect the virtual machines. A central controller is used to control, and distribute firewall rules to, firewall engines that are distributed over different hosts. However, conventional firewall rule creation approach may not be optimal for data center security.

DETAILED DESCRIPTION

Figure 1:
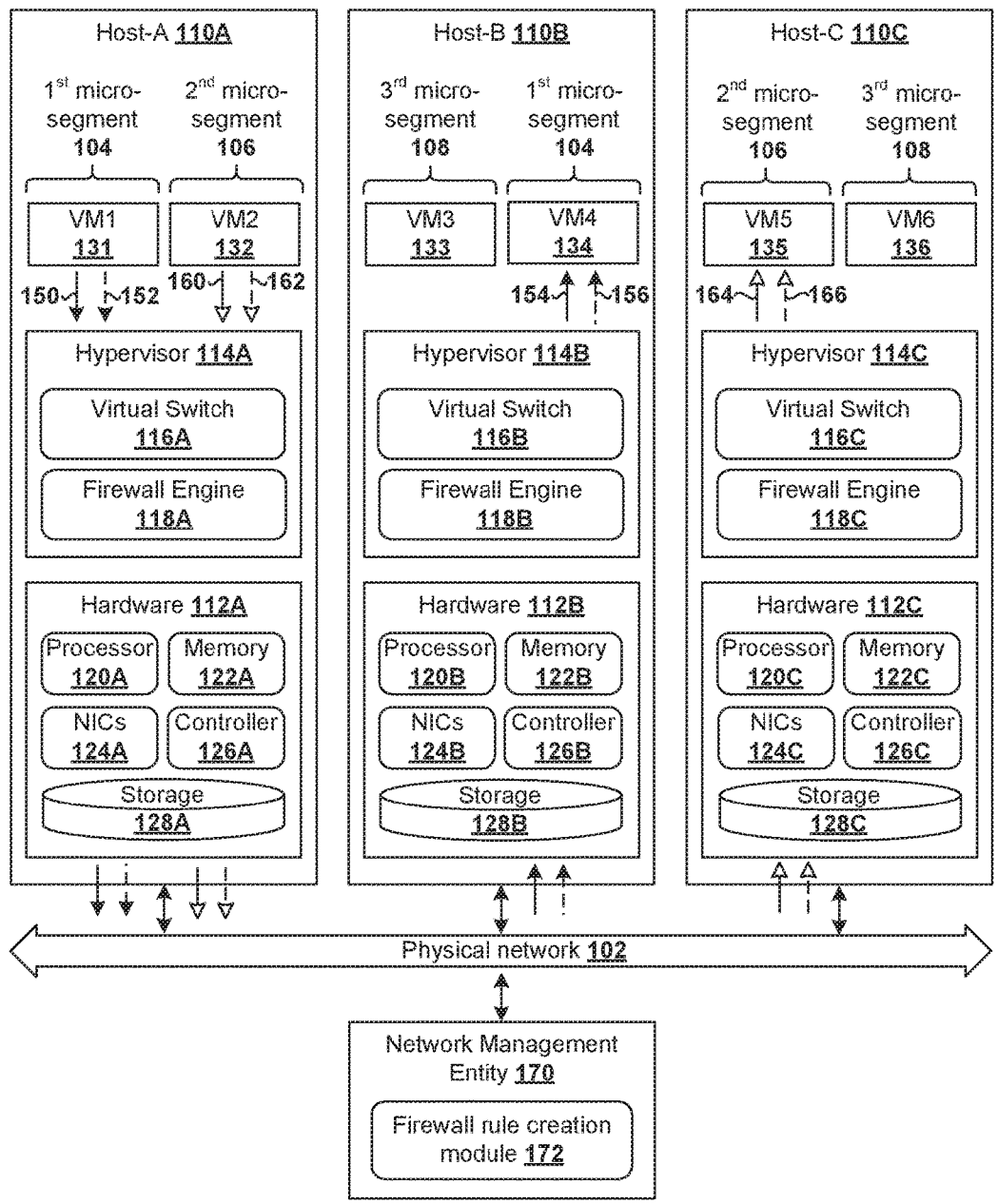
FIG. 1 is a schematic diagram illustrating an example virtualized computing environment in which firewall rule creation may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to data center security will now be explained in more detail using FIG. 1, which is a schematic diagram illustrating example virtualized computing environment 100 in which firewall rule creation may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are connected via physical network 102. Each host 110A/110B/110C includes suitable hardware 112A/112B/112C and virtualization software (e.g., hypervisor 114A/114B/114C) to support virtual machines. For example, host-A 110A supports "VM1" 131 and "VM2" 132; host-B 110B supports "VM3" 133 and "VM4" 134; and host-C 110C supports "VM5" 135 and "VM6" 136. Although three hosts each having two virtual machines are shown for simplicity, any number of hosts may reside on a network where each host (also known as a "computing device", "host computer", "host device", "physical server", "server system", etc.) may be supporting tens or hundreds of virtual machines in practice.

Although examples of the present disclosure refer to virtual machines, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Hypervisor 114A/114B/114C maintains a mapping between underlying hardware 112A/112B/112C and virtual resources allocated to respective virtual machines 131-136. Hardware 112A/112B/112C includes suitable physical components, such as Central Processing Unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to virtual machines 131-136 to support various applications running on top of respective guest operating systems, etc. For example, corresponding to hardware 112A/112B/112C, the virtual resources may include virtual CPU, virtual memory, virtual disk, virtual network interface controller (vNIC), etc. In practice, hypervisor 114A/114B/114C implements virtual machine monitors (not shown for simplicity) to emulate hardware resources.

Hypervisor 114A/114B/114C implements virtual switch 116A/116B/116C to handle traffic forwarding to and from virtual machines. For example, "VM1" 131 on host-A 110A may communicate with "VM4" 134 on host-B 110B during a file transfer protocol (FTP) session (see 150, 152, 154, 156). In another example, "VM2" 132 on Host-A 110A may communicate with "VM5" 134 on host-C 110C, such as during a Remote Procedure Call (RPC) session (see 160, 162, 164,166). In these examples, virtual switch 116A handles egress packets (i.e., outgoing packets) from, and ingress packets (i.e., incoming packets) destined for, "VM1" 131 and "VM2" 132. Similarly, virtual switch 116B at host-B 110B handles packets for "VM4" 134, and virtual switch 116C at host-C 110C for "VM5" 135. Physical network 102 may include any suitable number of interconnected physical network devices (not shown for simplicity), such as layer-3 routers, layer-2 switches, gateway devices, etc.

As used herein, the term "packet" may refer generally to a group of bits that can be transported together, and may be in another form, such as "frame", "message", "segment", etc. The term "endpoint" may refer generally to an originating or terminating node of a bi-directional inter-process communication flow. In practice, an endpoint may be implemented by a virtual machine (e.g., "VM1" 131), physical server, etc. The term "layer 2" may refer generally to a Media Access Control (MAC) layer; "layer 3" to a network layer; "layer 4" to a transport layer; and "layer 7" to an application layer in the Open System Interconnection (OSI) model, although the concepts described herein may be used with other networking models.

To protect host 110A/110B/110C against security threats caused by unwanted packets, hypervisor 114A/114B/114C implements firewall engine 118A/118B/118C to filter packets to and from respective virtual machines 131-136. In the example in FIG. 1, a distributed firewall is implemented using local firewall engine 118A/118B/118C at each host 110A/110B/110C. Security policies (e.g., firewall rules) for packet filtering are configurable through network management entity 170, which may be a network virtualization manager (sometimes referred to as a software defined network (SDN) manager) on a management plane of virtualized computing environment 100. In practice, an example of a network manager is the NSX manager component of VMware NSX™, available from VMware, Inc. Network management entity 170 may be implemented by one or more physical and/or virtual entities.

Through network virtualization, benefits similar to server virtualization may be derived for networking services in virtualized computing environment 100. For example, software-defined networks (SDNs) may be provisioned, changed, stored, deleted and restored programmatically via network management entity 170 without having to reconfigure the underlying physical hardware. Further, network segmentation may be used to segment a data center into distinct network segments using software. In the example in FIG. 1, micro-segmentation (e.g., network segmentation at the virtual machine level) may be used to segregate virtual machines 131-136 into multiple micro-segments based on how they communicate with each other. For example, three micro-segments may be created: first micro-segment 104 having "VM1" 131 and "VM4" 134; second micro-segment 106 having "VM2" 132 and "VM5" 135; and third micro-segment 108 having "VM3" 133 and "VM6" 136. This way, traffic travelling from one micro-segment to another may be restricted, thereby limiting an attacker's ability to move laterally in the data center.

Unfortunately, in practice, it can be quite challenging to create firewall rules that can achieve micro-segmentation. Conventionally, one approach is to perform flow monitoring and create firewall rules based on the results of the flow monitoring. For example, flow monitoring may be performed using Internet Protocol Flow Information Export (IPFIX), NetFlow Logic (a trademark of NetFlow Logic Corporation), etc. However, deriving stateful firewall rules from stateless flows may not produce accurate results. For example, one source of inaccuracy is due to Application Level Gateway (ALG) processing performed by firewall engine 118A/118B/118C.

In more detail, ALG is designed to manage certain application-layer protocols, such as FTP and RPC shown in FIG. 1. Using ALG, a "pinhole" may be dynamically created in the firewall to allow transfer of packets via a particular port number during an application-layer protocol session between a pair of endpoints (e.g., FTP session between "VM1" 131 and "VM4" 134). However, such application-layer protocol session often utilize multiple flows, such as control and data flows. Through the control flow, ephemeral (i.e., temporary) port numbers are randomly assigned for each data flow. If a firewall rule is created for each and every flow according to the conventional approach, this will result in many pinholes that stay open in the firewall, which potentially increase exposure to security threats.

Firewall Rule Creation

According to examples of the present disclosure, the process of firewall rule creation may be improved by considering the association between control and data flows of a particular application-layer protocol session. As will be explained further below, examples of the present disclosure facilitate the creation of a more concise and optimized set of firewall rules. This reduces the number of pinholes that need to be opened in the firewall, such as pinholes for ephemeral port numbers that are dynamically assigned for data flows, to reduce the risk of security threats.

Figure 2:
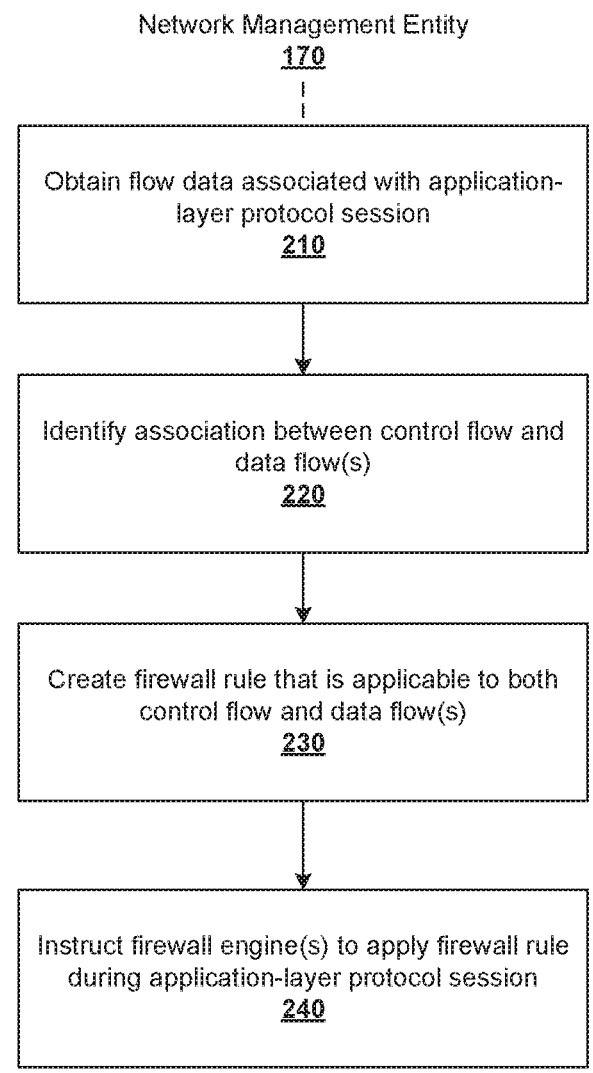
FIG. 2 is a flowchart of an example process for a network management entity to perform firewall rule creation in a virtualized computing environment.

FIG. 2 is a flowchart of an example process 200 for network management entity 170 to perform firewall rule creation in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. Example process 200 may be implemented by network management entity 170, such as using firewall rule creation module 172 or any additional or alternative module.

At 210 in FIG. 2, flow data associated with an application-layer protocol session is obtained. As will be described further using FIG. 3 to FIG. 5, the flow data may include any suitable state data of each flow of the application-layer protocol session, such as source IP address and port number, destination IP address and port number, protocol, etc. Here, the term "application-layer protocol session" may refer generally to any suitable session established using an application-layer protocol to facilitate exchange of application-layer information between endpoints (e.g., acting as client and server respectively).

For example in FIG. 1, the flow data may be associated with an FTP session that includes control and data flows between "VM1" 131 ("first endpoint") and "VM4" 134 ("second endpoint"). In another example, the flow data may be associated with an RPC session between "VM2" 132 ("first endpoint") and "VM5" 135 ("second endpoint"), such as using Microsoft RPC (MS-RPC), Sun Microsystems RPC (SUN RPC; also known as Open Network Computing RPC), etc. Other example multichannel (control/data) application-layer protocols include Common Internet File System (CIFS), Transparent Network Substrate (TNS), Trivial File Transfer Protocol (TFTP), etc.

At 220 in FIG. 2, an association or correlation between a control flow and at least one data flow of the application-layer protocol session is identified from the flow data. At 230 in FIG. 2, based on the association, a firewall rule that is applicable to both the control flow and at least one data flow is created. At 240 in FIG. 2, a first firewall engine associated with the first endpoint (e.g., firewall engine 118A of "VM1" 131), or a second firewall engine associated with the second endpoint (e.g., firewall engine 118B of "VM4" 134), or both, are instructed to apply the firewall rule during the application-layer protocol session.

The term "applicable" may refer to direct or indirect application of the firewall rule. For example, the firewall rule may be "directly applicable" to allow the control flow, while "indirectly applicable" to allow the data flow. In the case of direct application, the firewall rule may be created to allow communication via a control port number associated with the control flow. Through the control flow, at least one ephemeral data port number may be dynamically negotiated for the respective at least one data flow. In the case of indirect application, the firewall rule may specify an application-layer protocol for which ALG processing is supported by the first firewall engine (e.g., firewall engine 118A), second firewall engine (e.g., firewall engine 118B), or both. This way, ALG processing may be performed based on the firewall rule (i.e., indirectly) to allow communication via the at least one ephemeral data port number negotiated through the control flow.

In the example in FIG. 1, network management entity 170 may create a firewall rule based on an association between control flow 150 and data flow 152 of the FTP session between "VM1" 131 and "VM4" 134. The firewall rule may be created to allow the FTP session via a control port number associated with control flow 150 and a data port number associated with data flow 152. The data port number may be an ephemeral port number that is dynamically negotiated using control flow 150. As will be described further below, the firewall rule may be created based on control flow 150, while ignoring data flow 152.

In the following, various examples will be explained using FIG. 3 to FIG. 7. In particular, an example detailed process will be explained using FIG. 3; example application-layer protocol sessions using FIG. 4 and FIG. 5; example tree structure using FIG. 6; and example firewall rules using FIG. 7. Although "VM1" 131, "VM2" 132, "VM4" 134 and "VM5" 135 are described as example endpoints through the present disclosure, it should be understood that an endpoint may also be an external server (e.g., physical and/or virtual entity) in practice. For example, "VM1" 131 may interact with an external FTP server (not shown for simplicity) instead of "VM4" 134.

Flow Monitoring

Figure 3:
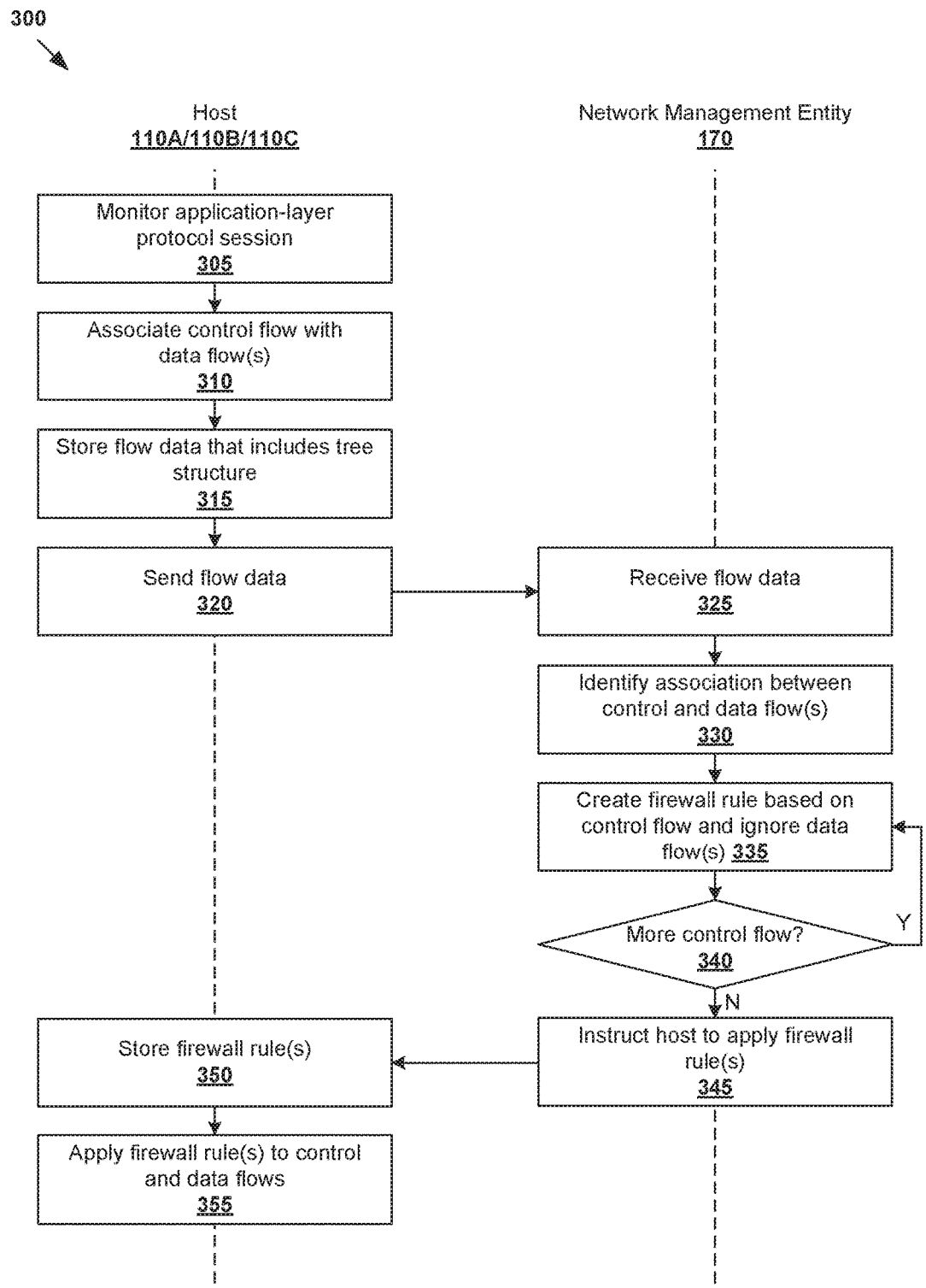
FIG. 3 is a flowchart of an example detailed process for firewall rule creation in a virtualized computing environment.

FIG. 3 is a flowchart of example detailed process 300 for firewall rule creation in virtualized computing environment 100. Example process 300 may include one or more operations, functions, or actions illustrated by one or more blocks, such as 305 to 355. The various blocks may be combined into fewer blocks, divided into additional blocks, and/or eliminated depending on the desired implementation. In the example in FIG. 1, host 110A/110B/110C may perform blocks 305-320 and 350-355 using hypervisor 114A/114B/1146C, and more particularly firewall engine 118A/118B/118C. Network management entity 170 may perform blocks 325-345 in FIG. 3 using firewall rule creation module 172, etc.

At 305 in FIG. 3, host 110A/110B/110C performs flow monitoring to monitor an application-layer protocol session, such as by analyzing an application-layer payload encapsulated in packets originating from an endpoint supported by host 110A/110B/110C. The application-later payload is encapsulated with a transport layer header to form a transport layer segment (e.g., TCP segment), which is in turn encapsulated with a network layer header to form a network layer packet.

At 310 and 315 in FIG. 3, host 110A/110B/110C associates a control flow with at least one data flow of the application-layer protocol session, and stores related flow data. Two examples will be described below.

(a) FTP Session

Figure 4:
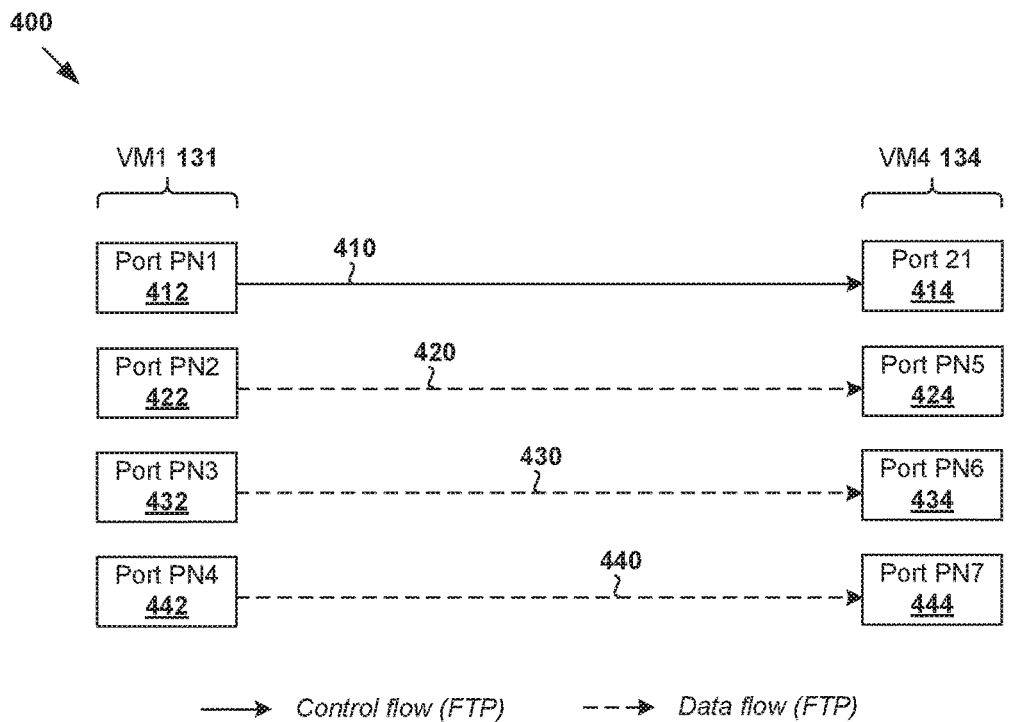
FIG. 4 is a schematic diagram illustrating a first example application-layer protocol session using File Transfer Protocol (FTP)

FIG. 4 is a schematic diagram illustrating first example application-layer protocol session 400 using FTP. In this example, "VM1" 131 on host-A 110A represents a "first endpoint" and "VM4" 134 on host-B 110B as the "second endpoint". FTP session 400 requires two types of flow: control flow and data flow. The control flow is generally a persistent connection or channel over which control commands or responses are communicated. The data flow is usually established for data transfer.

In practice, FTP session 400 may be detected at block 305 in FIG. 3 based on a request to establish a control flow originating from "VM1" 131 (e.g., acting as a client) and destined for TCP port 21 on "VM4" 134 (e.g., acting as a server). Through the control flow, data port numbers for data flows are dynamically negotiated. FTP supports two data transfer modes: active mode and passive mode. In the active mode (i.e., client-managed), the data flow is established with destination TCP port 20 (not shown in FIG. 4 for simplicity) on "VM4" 134. In the passive mode (i.e., server-managed) shown in FIG. 4, random port numbers are dynamically assigned based on resource availability. In this case, "VM1" 131 may specify the passive mode by sending a "PASV" command to destination port 21 on "VM4" 134. In response, "VM4" 134 replies with a random port number that "VM4" 134 has opened for "VM1" 131. This process may be repeated to establish multiple data flows.

Example control and data flows are shown in FIG. 4. Control flow 410 is between port PN1 of "VM1" 131 (see 412) and TCP port 21 of "VM4" 134 (see 414). TCP port 21 is a predefined or well-known port number for FTP. First data flow 420 is between port PN2 (see 422) and port PN5 (see 424); second data flow 430 between port PN3 (see 432) and port PN6 (see 434); and third data flow 440 between port PN4 (see 442) and port PN7 (see 444). Besides control port number=21 on "VM4" 134, all the other port numbers are usually assigned dynamically and randomly. For example, PN5=41697, PN6=40768 and PN7=35095 may be used for the data flows.

Flow data relating flows 410-440 may be stored in state data table 450 in FIG. 4. Entry 416 is created for control flow 410, while entries 426, 436 and 446 are for respective data flows 420, 430, 440. Each entry specifies the direction=outbound (see 451) of the corresponding flow, as well as its source IP address=IP-VM1 (see 452) and destination IP address=IP-VM4 (see 454). Based on the (known) control port number=21, control flow 410 is associated with application service=FTP (see 456) and tag=control (see 458). Based on their respective random port numbers, data flow 420/430/440 is associated with service=TCP port number (see 456) to which "VM1" 131 connects and tag=data (see 458).

(b) RPC Session

Figure 5:
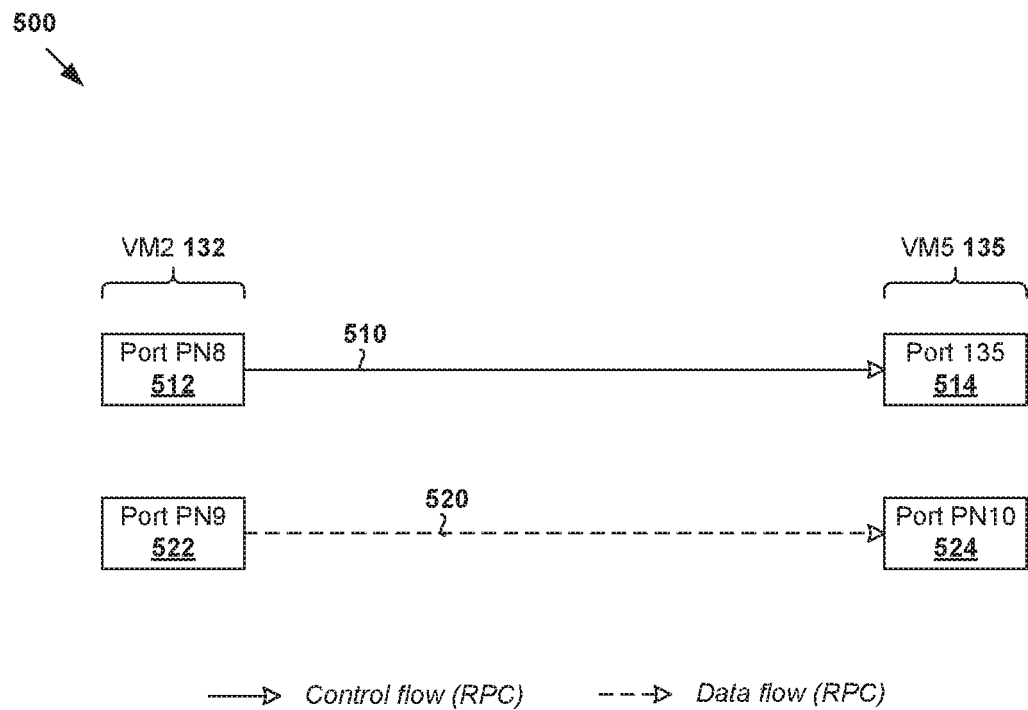
FIG. 5 is a schematic diagram illustrating a second example application-layer protocol session using Remote Procedure Call (RPC)

In a second example, FIG. 5 is a schematic diagram illustrating second example application-layer protocol session 500 using RPC. In this case, "VM2" 132 on host-A 110A acts as the "first endpoint" and "VM5" 135 on host-C 11C as the "second endpoint." In practice, RPC session 500 is an inter-process communication mechanism that enables an application running in a first address space (e.g., at "VM2" 132) to access the resources of applications running in a second address space (e.g., at "VM5" 135) as if the resources were local to the first address space.

RPC session 500 may be detected at block 305 in FIG. 3 based on a connection request initiated by "VM2" 132 (acting as a client) and destined for "VM5" 134 (acting as a server or RPC endpoint mapper). For example in FIG. 5, control flow 510 is between source port PN8 on "VM2" 132 (see 512) and destination port 135 on "VM4" 134 (see 516). Once control flow 510 is established, "VM5" 135 dynamically assigns a port number (e.g., between 1024 and 65,535) to a service requested by "VM2" 132. For example in FIG. 5, data flow 520 is between port PN9 on "VM2" 132 (see 522) and PN10 on "VM5" 135 (see 524). Similar to the FTP example in FIG. 4, PN8, PN9 and PN10 are usually assigned randomly and dynamically.

Data relating to each flow may be stored in state data table 550. First entry 516 is created for control flow 510, and second entry 526 for data flow 520. Similar to the examples in FIG. 4, each entry specifies the direction=outbound (see 551) of the corresponding flow, as well as its source IP address=IP-VM2 (see 552) and destination IP address=IP-VM5 (see 554). At entry 516, control flow 510 is associated with service=TCP 135 (see 556; a well-known port for RPC) and tag=control (see 558). At entry 526, data flow 520 is associated with service=TCP PN10 (see 556) on "VM5" 135 to which "VM2" 132 connects and tag=data (see 558).

In the examples in FIG. 4 and FIG. 5, it should be understood that state data table 450/550 may include any additional and/or alternative data items that can be obtained from a packet, such as sequence number, etc. Also, although outbound flows are described using FIG. 4 and FIG. 5, it should be understood that inbound flows may be monitored and tracked using state data table 450/550. In practice, separate firewall rules may be created for each outbound or inbound direction.

(c) ALG Tree

Figures 6, 7:
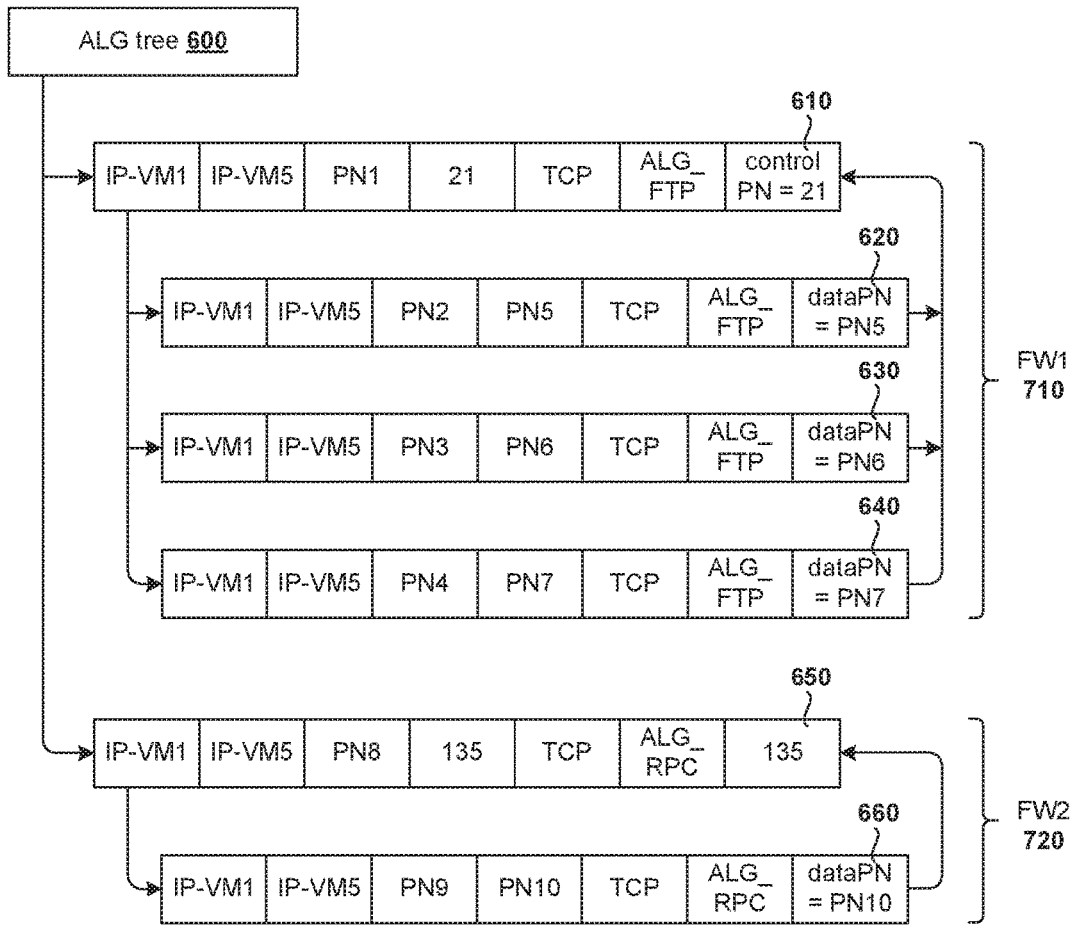
FIG. 6 is a schematic diagram illustrating an example tree structure based on which firewall rule creation is performed.
FIG. 7 is a schematic diagram illustrating example firewall rules created based on the tree structure in FIG. 6.

FIG. 6 is a schematic diagram illustrating example tree structure 600 based on which firewall rule creation is performed. In the example in FIG. 6, a parent node may be created to represent a control flow, while a child node linked to the parent node represents a data flow associated with the control flow. It should be understood that any suitable data structure other than that shown in FIG. 6 may be used, such as a linked list, etc. In practice, tree structure 600 may be known as an ALG tree.

Relating to FTP session 400 in FIG. 4, parent node 610 represents control flow 410 and is linked to child nodes 620, 630, 640 representing respective data flows 420, 430 and 440 in FIG. 4. At 610 in FIG. 6, the parent node associated with control flow 410 specifies source IP address=IP-VM1, destination IP address=IP-VM4, source port number=PN1 on "VM1" 131, layer 4 protocol=TCP, ALG protocol=FTP, and destination port number=control port number=21.

At 620 in FIG. 6, a first child node associated with first data flow 420 specifies source port number=PN2 and destination port number=data port number=PN5. At 630 in FIG. 6, a second child node specifies source port number=PN3 and destination port number=data port number=PN6 of second data flow 430. At 640 in FIG. 6, a third child node specifies source port number=PN4 and destination port number=data port number=PN7 of third data flow 430.

Relating to RPC session 500 in FIG. 5, parent node 650 represents control flow 510 and child node 660 represents its associated data flow 520. At 650 in FIG. 6, the parent node representing control flow 510 specifies source IP address=IP-VM2, destination IP address=IP-VM5, source port number=PN8, layer 4 protocol=TCP, ALG protocol=RPC, and destination port number=control port number=135. At 660 in FIG. 6, a child node associated with data flow 520 specifies source port number=PN9 and destination port number=data port number=PN10.

Referring to FIG. 3 again, at 320, firewall engine 118A/118B/118C at host 110A/110B/110C sends flow data to network management entity 170 for firewall rule creation. The frequency at which the flow data is configurable, such as every few minutes, etc. The flow data includes state data table 450/550 in FIG. 4 and FIG. 5, and tree structure 600 explained using FIG. 6.

Firewall Rule Creation

Example firewall rule creation will be explained using blocks 325 to 345 in FIG. 3. In particular, at 325 and 330 in FIG. 3, network management entity 170 receives the flow data from host 110A/110B/110C and identifies an association between control and data flows of an application-layer protocol session. In particular, based on parent node 610 and its child nodes 620, 630, 640 in tree structure 600 in FIG. 6, network management entity 170 may identify that control flow 410 is associated with data flows 420, 430 and 440 of FTP session 400. Based on parent node 650 and its child node 660 in tree structure 600 in FIG. 6, network management entity 170 may identify that control flow 510 is associated with data flow 520 of RPC session 500.

Conventionally, a firewall rule is created for each and every detected flow. In the FTP example in FIG. 4, four firewall rules will be created to allow control flow 410 and data flows 420, 430 and 440 respectively. In the RPC example in FIG. 5, two firewall rules will be created to allow control flow 510 and data flow 520 respectively. Each firewall rule punches a pinhole in the firewall. In practice, security threats may occur through pinholes that need to be opened for ephemeral data flows, which are established based on data port number negotiation through the control flow. As additional data flows that use ephemeral port numbers are established, it is necessary to create additional firewall rules to allow those flows.

According to examples of the present disclosure, firewall rules may be created based on tree structure 600 in FIG. 6. In more detail, at 335 in FIG. 3, network management entity 170 traverses through tree structure 600 to retrieve a parent node representing a control flow, and create a firewall rule that is applicable to both control and data flows of the same application-layer protocol session. In one example, the firewall rule is created based on each parent node in tree structure 600, while all child nodes will be ignored or skipped. At 340 in FIG. 3, block 335 is repeated until all parent nodes and corresponding control flows are considered.

FIG. 7 is a schematic diagram illustrating example firewall rules 700 created based on tree structure 600 in FIG. 6. For FTP session 400 in FIG. 4, network management entity 170 creates first firewall rule 710 that is applicable to control flow 410 and data flows 420, 430, 440. In particular, this may involve network management entity 170 retrieving first parent node 610 from tree structure 600, and creating first firewall rule 710 based on parent node 610. Referring to FIG. 7, first firewall rule 710 labelled "FW1" (see 701) specifies the source IP address=IP-VM1 (see 702), destination IP address=IP-VM4 (see 703), service=FTP (see 704), and action=allow (see 705). No separate firewall rules are created for child nodes 620, 630, 640 representing respective data flows 420, 430, 440.

For RPC session 500 in FIG. 5, network management entity 170 creates second firewall rule 720 that is applicable to control flow 510 and data flow 520. Similarly, this may involve network management entity 170 retrieving parent node 650 representing control flow 510 from tree structure 600, and creating second firewall rule 720 based on parent node 650. Referring to FIG. 7, second firewall rule 720 labelled "FW2" (see 701) specifies the source IP address=IP-VM2 (see 702), destination IP address=IP-VM5 (see 703), service=RPC (see 704), and action=allow (see 705). Again, no separate firewall rule is created for child node 660 representing data flow 520.

In the above examples, the service field (see 704) in first firewall rule 710 for FTP session 400 and second firewall rule 720 for RPC session 500 specifies an application-layer protocol for which ALG processing is supported by firewall engine 118A/118B/118C. For example, firewall engine 118A/118B/118C may support ALG processing for certain application-layer protocols, such as FTP, RPC (e.g., MS-RPC, SUN RPC), CIFS, TNS, TFTP, etc. Based on the service field (see 704), firewall engine 118A/118B/118C may determine that ALG processing is required to allow communication via an ephemeral data port number for a data flow associated with the control flow.

At 345, 350 and 355 in FIG. 3, network management entity 170 instructs the relevant host to store and apply firewall rules in FIG. 7. For example, firewall engine 118A at host-A 110A supporting "VM1" 131 and "VM2" 132 may be instructed to store and apply firewall rule 710, 720. For FTP session 400 in FIG. 4, firewall rule application at 355 in FIG. 3 may involve firewall engine 118A detecting an egress packet from "VM1" 131 and inspects the IP address and port number information of the egress packet. Based on source IP address=IP-VM1 and destination IP address=IP-VM4, firewall engine 118A may determine that first firewall rule 710 is applicable (i.e., a match is found).

Based on service=FTP (i.e., an application-layer protocol associated with ALG processing) specified by first firewall rule 710, firewall engine 118A may determine that ALG processing is required. If the egress packet contains destination port number=control port number=21 specified by first firewall rule 710, the egress packet is allowed. Otherwise, if the egress packet contains destination port number=data port number=PN5, firewall engine 118A may determine whether to allow the egress packet by performing ALG processing based on first firewall rule 710. More specifically, tree structure 600 may be searched to determine whether PN5 is a data port number of FTP session 400. If yes (i.e., PN5 is the destination port number of data flow 420), the egress packet is allowed. Otherwise, the egress packet will be blocked.

Similarly, for RPC session 500 in FIG. 5, firewall rule application at 355 in FIG. 3 may involve firewall engine 118A detecting an egress packet from "VM2" 132 and inspecting the header information of the egress packet. Based on source IP address=IP-VM2 and destination IP address=IP-VM5, firewall engine 118A may determine that second firewall rule 720 is applicable.

Based on service=RPC (i.e., an application-layer protocol associated with ALG processing) specified by second firewall rule 720, firewall engine 118A may determine that ALG processing is required. If the egress packet contains destination port number=control port number=135 specified by second firewall rule 720, the egress packet is allowed. If the egress packet contains destination port number=data port number=PN10, firewall engine 118A may determine whether to allow the egress packet by performing ALG processing based on second firewall rule 720. More specifically, tree structure 600 may be searched to determine whether PN10 is a data port number of a data flow in RPC session 500. If yes (i.e., PN10 is the destination port number of data flow 520), the egress packet is allowed. Otherwise, the egress packet will be blocked.

According to examples of the present disclosure, firewall rule table 700 is more concise and optimized compared to the conventional approach. As discussed above, firewall rules 710, 720 are applicable to both control and data flows of respective FTP session 400 and RPC session 500. Since dynamic ephemeral port numbers are usually for data flows, firewall rules are not created for each and every data flow to reduce the number of firewall rules and corresponding pinholes in the firewall.

Also, according to examples of the present disclosure, firewall rules may be applied more efficiently. A tree search that is generally less expensive than a linear search may be used to traverse tree structure 600. This should be contrasted against the conventional approach that creates, for example, four firewall rules for respective flows 410-440 in FTP session 400. This conventional approach necessitates a linear search to match the header information of the egress packet to one of the firewall rules.

In the above examples, firewall rules 710, 720 are created to allow or block egress packets at source host-A 110A. Alternatively or additionally, firewall rules may be created to allow or block ingress packets at destination host-B 110B or host-C 110C. Similarly, first firewall rule 710 is applicable to ingress packets of FTP session 400, and second firewall rule 720 to ingress packets of RPC session 500.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as network management entity 170 or host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform firewall rule creation in a virtualized computing environment that includes the network management entity, a first endpoint and a second endpoint, wherein the method comprises:
    obtaining flow data associated with an application-layer protocol session between the first endpoint and second endpoint;
    identifying, from the flow data, an association between a control flow and at least one data flow of the application-layer protocol session;
    based on the association, creating a firewall rule that is applicable to both the control flow and at least one data flow; and
    instructing a first firewall engine associated with the first endpoint, or a second firewall engine associated with the second endpoint, or both, to apply the firewall rule during the application-layer protocol session, wherein the first firewall engine, or the second firewall engine, or both processes packets in response to the instructing to apply the firewall rule.

2. The method of claim 1, wherein creating the firewall rule comprises:
    creating the firewall rule based on the control flow, while ignoring the at least one data flow during firewall rule creation.

3. The method of claim 2, wherein creating the firewall rule comprises:
    creating the firewall rule to allow communication via a control port number associated with the control flow, wherein at least one ephemeral data port number is dynamically negotiated for the respective at least one data flow through the control flow.

4. The method of claim 3, wherein creating the firewall rule comprises:
    creating the firewall rule to specify an application-layer protocol for which application-layer gateway (ALG) processing is supported by the first firewall engine, the second firewall engine, or both, wherein the ALG processing is to allow communication via the at least one ephemeral data port number based on the firewall rule.

5. The method of claim 1, wherein identifying the association comprises:
    traversing a tree structure in the flow data to identify the association based on a parent node and at least one child node linked to the parent node, wherein the parent node represents the control flow and the at least one child node represents respective at least one data flow.

6. The method of claim 1, wherein obtaining the flow data comprises:
    obtaining the tree structure from the first firewall engine, the second firewall engine, or both.

7. The method of claim 1, wherein obtaining the flow data comprises:
    obtaining the flow data associated with the application-layer protocol session that utilizes one of the following application-layer protocols: File Transfer Protocol (FTP), Remote Procedure Call (RPC), Common Internet File System (CIFS), Transparent Network Substrate (TNS) and Trivial File Transfer Protocol (TFTP).

8. A non-transitory computer-readable storage medium that includes a set of instructions which, in response to execution by a processor of a network management entity, cause the processor to perform a method of firewall rule creation in a virtualized computing environment that includes the network management entity, a first endpoint and a second endpoint, wherein the method comprises:
    obtaining flow data associated with an application-layer protocol session between the first endpoint and second endpoint;
    identifying, from the flow data, an association between a control flow and at least one data flow of the application-layer protocol session;
    based on the association, creating a firewall rule that is applicable to both the control flow and at least one data flow; and
    instructing a first firewall engine associated with the first endpoint, or a second firewall engine associated with the second endpoint, or both, to apply the firewall rule during the application-layer protocol session, wherein the first firewall engine, or the second firewall engine, or both processes packets in response to the instructing to apply the firewall rule.

9. The non-transitory computer-readable storage medium of claim 8, wherein creating the firewall rule comprises:
    creating the firewall rule based on the control flow, while ignoring the at least one data flow during firewall rule creation.

10. The non-transitory computer-readable storage medium of claim 9, wherein creating the firewall rule comprises:
    creating the firewall rule to allow communication via a control port number associated with the control flow, wherein at least one ephemeral data port number is dynamically negotiated for the respective at least one data flow through the control flow.

11. The non-transitory computer-readable storage medium of claim 10, wherein creating the firewall rule comprises:
creating the firewall rule to specify an application-layer protocol for which application-layer gateway (ALG) processing is supported by the first firewall engine, the second firewall engine, or both, wherein the ALG processing is to allow communication via the at least one ephemeral data port number based on the firewall rule.

12. The non-transitory computer-readable storage medium of claim 8, wherein identifying the association comprises:
traversing a tree structure in the flow data to identify the association based on a parent node and at least one child node linked to the parent node, wherein the parent node represents the control flow and the at least one child node represents respective at least one data flow.

13. The non-transitory computer-readable storage medium of claim 8, wherein obtaining the flow data comprises:
obtaining the tree structure from the first firewall engine, the second firewall engine, or both.

14. The non-transitory computer-readable storage medium of claim 8, wherein obtaining the flow data comprises:
obtaining the flow data associated with the application-layer protocol session that utilizes one of the following application-layer protocols: File Transfer Protocol (FTP), Remote Procedure Call (RPC), Common Internet File System (CIFS), Transparent Network Substrate (TNS) and Trivial File Transfer Protocol (TFTP).

15. A computer system configured to perform firewall rule creation in a virtualized computing environment, the computer system comprising:
a processor; and
a non-transitory computer-readable medium having stored thereon instructions that, when executed by the processor, cause the processor to:
obtain flow data associated with an application-layer protocol session between a first endpoint and a second endpoint in the virtualized computing environment;
identify, from the flow data, an association between a control flow and at least one data flow of the application-layer protocol session;
based on the association, create a firewall rule that is applicable to both the control flow and at least one data flow; and
instruct a first firewall engine associated with the first endpoint, or a second firewall engine associated with the second endpoint, or both, to apply the firewall rule during the application-layer protocol session, wherein the first firewall engine, or the second firewall engine, or both processes packets in response to the processor instructing to apply the firewall rule.

16. The computer system of claim 15, wherein instructions for creating the firewall rule cause the processor to:
create the firewall rule based on the control flow, while ignoring the at least one data flow during firewall rule creation.

17. The computer system of claim 16, wherein instructions for creating the firewall rule cause the processor to:
create the firewall rule to allow communication via a control port number associated with the control flow, wherein at least one ephemeral data port number is dynamically negotiated for the respective at least one data flow through the control flow.

18. The computer system of claim 17, wherein instructions for creating the firewall rule cause the processor to:
create the firewall rule to specify an application-layer protocol for which application-layer gateway (ALG) processing is supported by the first firewall engine, the second firewall engine, or both, wherein the ALG processing is to allow communication via the at least one ephemeral data port number based on the firewall rule.

19. The computer system of claim 15, wherein instructions for identifying the association cause the processor to:
traverse a tree structure in the flow data to identify the association based on a parent node and at least one child node linked to the parent node, wherein the parent node represents the control flow and the at least one child node represents respective at least one data flow.

20. The computer system of claim 15, wherein instructions for obtaining the flow data cause the processor to:
obtain the tree structure from the first firewall engine, the second firewall engine, or both.

21. The computer system of claim 15, wherein instructions for obtaining the flow data cause the processor to:
obtain the flow data associated with the application-layer protocol session that utilizes one of the following application-layer protocols: File Transfer Protocol (FTP), Remote Procedure Call (RPC), Common Internet File System (CIFS), Transparent Network Substrate (TNS) and Trivial File Transfer Protocol (TFTP).

* * * * *